Patented Oct. 4, 1932

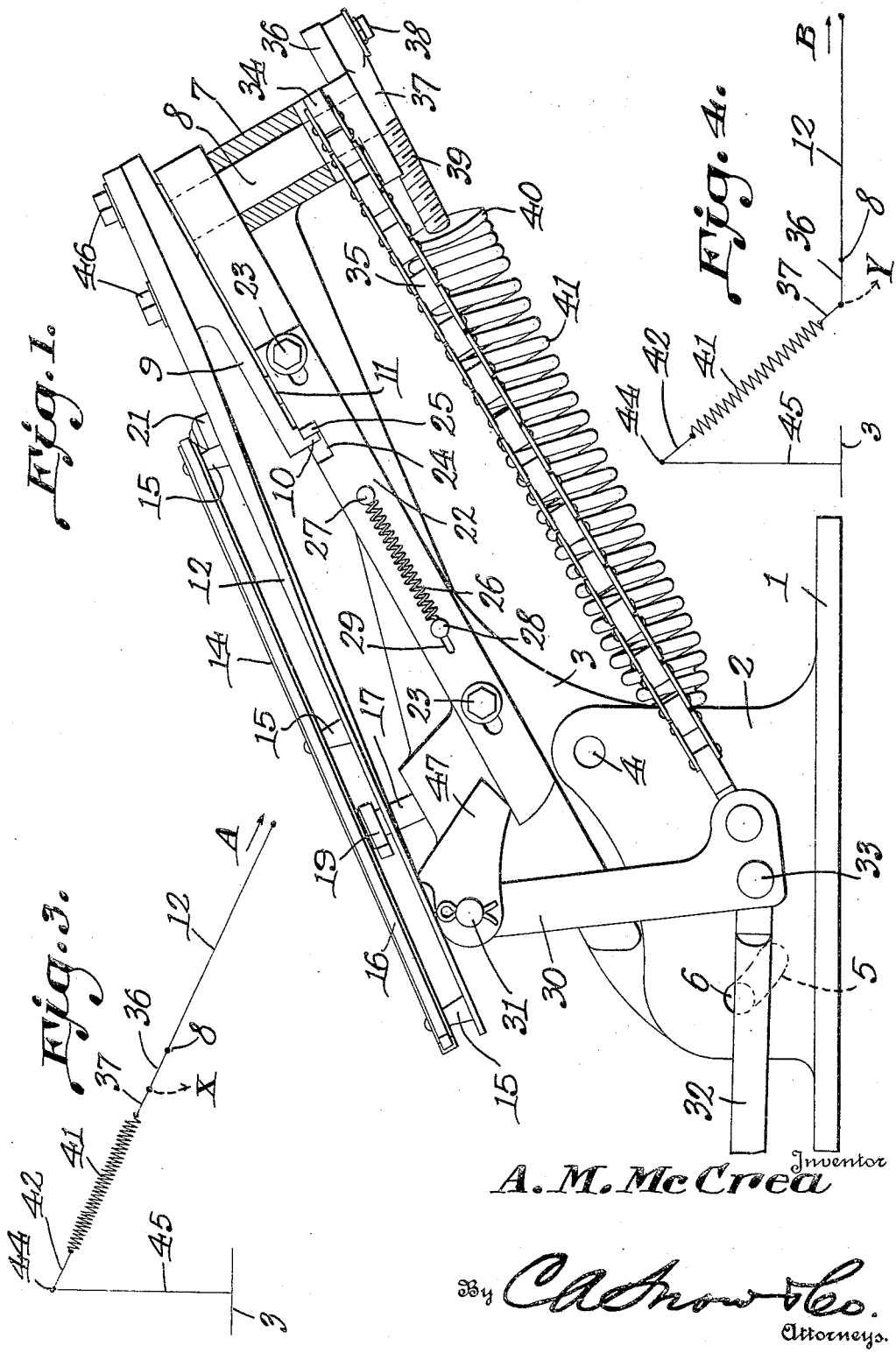

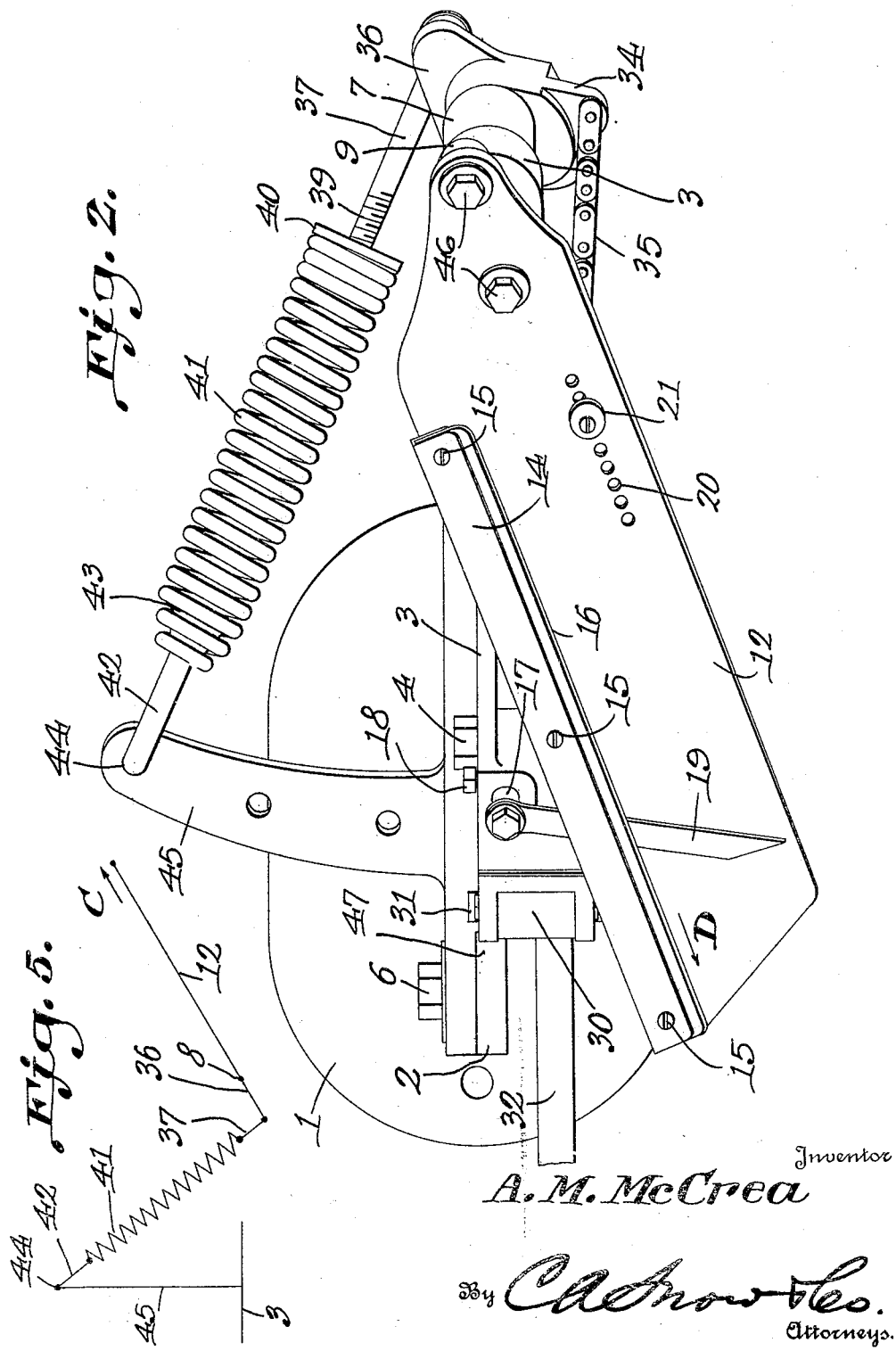

1,880,326

UNITED STATES PATENT OFFICE

ARTHUR M. McCREA, OF LAMAR, MISSOURI

TRAP

Application filed September 3, 1931. Serial No. 561,035.

This invention aims to provide a novel trap for throwing clay targets, and one object of the invention is to so construct the device that the targets will be thrown with approximately the same speed, and with approximately the same range, regardless of whether a right-quartering target, a straightaway target, or a left-quartering target is thrown. The invention aims, further, to improve generally and to enhance the utility of device of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a device constructed in accordance with the invention;

Figure 2 is a top plan; and

Figures 3, 4 and 5 are diagrams illustrating the operation of certain parts of the structure.

The device forming the subject matter of this application includes a support, embodying a base 1, carrying a vertical flange 2. A bracket 3 extends forwardly from the flange 2, and is connected to the flange 2 by a screw 4. The rear end of the bracket 3 has a curved slot 5, indicated in Figure 1. A screw 6 is threaded into the flange 2 and is located in the slot 5. The screw 4 may be loosened, so that it will serve as a pivot element, and when the screw 6 is loosened, the bracket 3 may be swung up and down, for adjustment, to regulate the angle with respect to the horizontal, at which the target is thrown. By tightening the screws 4 and 6, the bracket 3 will be held at any angle at which it may have been adjusted with respect to the horizontal.

On the outer end of the bracket 3 there is a bearing 7, in which a shaft 8 is journaled for rotation. On the upper portion of the shaft 8, above the bracket 3, there is secured a rearwardly extended first arm 9, carrying a depending keeper 10, adapted to engage a stop 11 on the bracket 3, when the carrier 12 is swung around to the position of Figure 2, to set the trap. The carrier 12 is secured at 46 to the first arm 9, and, therefore, to the shaft 8. On one edge of the carrier 12 there is a longitudinal rib 14 secured to the carrier and spaced therefrom, as indicated at 15. On its inner edge, the rib 14 carries a friction facing 16, made of rubber or other suitable material.

In the intermediate portion of the bracket 3, an upwardly extended shaft 17 is journaled for adjustment, but this shaft may be held in any position to which it may have been rotated, through the instrumentality of a set screw 18, threaded into the side of the bracket 3. On its upper end, the shaft 17 carries a stop 19, which extends transversely of the carrier 12, through the space that exists between the carrier and the rib 14. The carrier 12 has a longitudinal line of holes 20, spaced an appreciable and considerable distance from the stop 19. In any of the holes 20, a stop 21 may be mounted.

A latch bar 22 is located at the side of the bracket 3 and is mounted on the bracket, as shown at 23, for limited longitudinal sliding movement. In the upper edge of the latch bar 22 there is a notch 24, through which the keeper 10 on the first arm 9 is adapted to pass, when the carrier 12 is swung around to the set position of Figure 2. The forward wall of the notch 24 is bevelled inwardly as shown at 25. One end of a pull spring 26 is secured at 27 to the latch bar 22, the rear end of the spring being secured to a pin 28, mounted in the bracket 3, the latch bar 22 having a slot 29, through which the pin 28 passes, so as to permit the latch bar 22 to slide longitudinally.

The numeral 30 designates a downwardly extended trigger or radius rod, mounted pivotally at 31, in a lateral enlargement 47 on the bracket 3. An operating member 32, in the form of a push and pull rod, is pivoted at 33 to the lower end of the trigger 30. A second arm 34 is secured to the shaft 8, below the bearing 7. One end of a flexible element 35, such as a chain, is connected to the arm 34, the rear end of the flexible element 35 being connected to the lower end of the trigger or radius rod 30.

A third arm, denoted by the numeral 36, is secured to the lower end of the shaft 8 and projects in an opposite direction to the carrier 12, in alignment therewith. The numeral 37 designates a link, pivoted at 38 upon the arm 36. The rear end of the link 37 is threaded at 39, for adjustment, into a head 40, secured to the forward end of a pull spring 41, which is extended laterally and outwardly, as Figure 2 will show. The numeral 42 marks a link, provided at its forward end with a head 43 located in the rear end of the pull spring 41 and connecting the link 42 to the pull spring, the construction being such, however, that the spring 41 can be rotated, so as to cause the head 40 to move back and forth on the threaded portion 39 of the link 37, thereby adjusting the tension of the spring. The rear end of the link 42 is pivotally mounted at 44 in a lateral projection 45 extended outwardly from the bracket 3.

In practical operation, the attendant pushes on the rod 32, and the trigger 30 is tilted on its fulcrum 31, the trigger engaging the rear end of the latch bar 22 and pushing the latch bar forwardly, the spring 26 being elongated. The latch bar 22, thus, is carried forward, far enough so that the keeper 10 on the first arm 9 can pass through the notch 24 in the latch bar. The spring 41 exerts a pull on the arm 36 and rotates the shaft 8, the carrier 12 being swung around counter-clockwise, in Figure 2, to throw the target. By pulling on the rod 32, the trigger 30 is swung to the left in Figure 1, the flexible element 35 is pulled upon, the shaft 8 is rotated by means of the arm 34, and the carrier 12 is brought back to the set position of Figure 2, the keeper 10 on the arm 9 first engaging the bevelled edge 25 of the latch bar 22 to carry the latch bar forwardly, the keeper 10 passing through the notch 24 in the latch bar 22, and the latch bar then snapping back, in front of the keeper 10, under the action of the spring 26, the trap then being in the set position of Figure 1. Of course, should an occasion demand, there is no reason why the operator cannot take hold of the carrier 12 directly, and swing it around in the set position of Figure 2.

The stop 21 and the stop 19 are used to regulate the position of the target on the carrier 12, as hereinafter explained. By loosening the set screw 18, the shaft 17 may be turned, to adjust the position of the stop 19 with respect to the carrier 12, and the stop 21 can be placed in any of the holes 20, to adjust the position of that stop, longitudinally of the carrier 12.

With the carrier 12 in set position, as in Figure 2, if a target is placed on the carrier, in contact with the facing 16 of the rib 14, and in contact with the stop 19, then, when the trap is sprung, a right-quartering target will be thrown, in the direction of the arrow A in Figure 3. This is so because when the target moves along the part 16, in the direction of the arrow D in Figure 2, the target does not have very far to go before it arrives at the outer end of the part 16. If the target is laid on the carrier 12 at the proper place between the stops 19 and 21, a straight-away target will be thrown, in the direction of the arrow B in Figure 4, because the target has to move further in the direction of the arrow D in Figure 4 before the target arrives at the outer end of the part 16. If the target is laid on the carrier 12 in contact with the stop 21, a left-quartering target will be thrown, in the direction of the arrow C in Figure 5, because the target has to move still further in the direction of the arrow D in Figure 4 before the target arrives at the outer end of the part 16.

Suppose that by turning the head 40 along the threaded part 39 of the link 37, the spring 41 has been so tensioned that it will cause the carrier 12 to throw the target forty yards in the direction of the arrow A in Figure 3. Now if the spring 41 continued to pull on the arm 36, as the carrier 12 moved from the position of Figure 3 to the position of Figure 4, the speed of the carrier would be increased, and the straight-away target would be thrown, with increased speed, in the direction of the arrow B more than forty yards. The speed of the carrier 12 would be increased, as the carrier moved from the position of Figure 4 to the position of Figure 5, and the left-quartering target would be thrown in the direction of the arrow C, further and faster than the straight-away target. These undesirable results are done away with, in the device forming the subject matter of this application, by providing the projection 45. The projection 45 sets off the anchorage point 44 for the rear end of the spring 41 far enough to one side, so that when the carrier 12 is in the right-quartering position of Figure 3, the carrier 12, the arm 36, and the spring 41 are in the same straight line. By this time, the spring 41 has done all that it can do, as a means for throwing the target. As the arm 36 moves through the arc X of Figure 3 to the position of Figure 4, and as the arm moves through the arc Y of Figure 4, to the position of Figure 5, the spring 41 has to be stretched. In theory, this would slow down the movement of the carrier 12, lessen the range of the target, and lessen the speed with which it is projected. In practice, this slowing down does not amount to anything, because the arm 36 is short, compared with the length of the carrier 12, the stretch of the spring 41 being small, and the retarding pull of the spring being negligible, considered with respect to the momentum of the carrier 12. In practice, the carrier 12, in the three positions of Figures 4, 5 and 6, throws the target with no variation in speed or range which is of sufficient magnitude to make any difference with the shooter, a substantially uniform speed and range being attained, in a right-quartering target, a straight-away target and a left-quartering target.

Having thus described the invention, what is claimed is:—

A trap for throwing targets, comprising a support, a shaft journaled in the support, a carrier mounted on the shaft, a rib extended longitudinally of the carrier, first and second stops on the carrier and spaced longitudinally of the rib, the first stop being so located with respect to the length of the rib that when a target is placed against the first stop and against the rib, the time occupied by the target in rolling along the rib from the first stop to the outer end of the rib will enable the carrier to swing to a first position, in which a right-quartering target will be thrown, the second stop being so located with respect to the length of the rib that when a target is placed against the second stop and against the rib, the time occupied by the target in rolling along the rib from the second stop to the outer end of the rib will enable the carrier to swing to a second position, in which a left-quartering target will be thrown, an arm on the shaft and projecting therefrom in a direction opposite to the carrier, an actuating pull spring connected at one end to the arm, and means for anchoring the opposite end of the spring in such laterally offset relation to the axis of the shaft that when the carrier has arrived at said first position, the spring, the arm and the carrier will be in a straight line and cause the spring to cease pulling, the spring thereafter elongating under the action of the carrier, as the carrier moves to said second position, the mass of the carrier being such that the momentum of the carrier will offset the pull due to the elongation of the spring, and give to the outer end of the rib, when the carrier is in said second position, a speed in arc which is practically and substantially the same as that when the carrier is in said first position, and in a third position intermediate the positions stated.

In testimony that I claim the foregoing as my own, I have hereto affixed my signature.

ARTHUR M. McCREA.